Patented Nov. 30, 1948

2,455,193

UNITED STATES PATENT OFFICE 2,455,193

ALDEHYDE DERIVATIVES OF
2-AMINOALKANES

Ewald Rohrmann, Indianapolis, Ind., assignor to Eli Lilly and Company, Indianapolis, Ind., a corporation of Indiana No Drawing. Application July 26, 1944,
Serial No. 546,741

2 Claims. (Cl. 260—566)

It has previously been known that 2-aminoalkanes having from 6 to 9 carbon atoms are valuable pharmaceutically as vasoconstrictors. I have now discovered that aldehyde derivatives of these 2-aminoalkanes also possess vasoconstrictive properties and that on a weight-for-weight basis their vasoconstrictive activity is as great and in some cases greater than that of the respectively corresponding 2-aminoalkanes.

It is therefore the object of my invention to produce aldehyde derivatives of 2-aminoalkanes. These derivatives have the general structural formula:

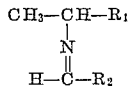

in which $R_1$ represents an alkyl group and $R_2$ represents a lower aliphatic or a monocyclic aromatic radical.

In carrying out my invention, I react the selected aldehyde with the selected 2-aminoalkanes, remove the water formed in the reaction, and distill the residue to obtain the desired aldehyde derivative. The 2-aminoalkanes used may be prepared by any of the general processes set forth in United States Letters Patent No. 2,350,318, granted May 30, 1944, on the application of Horace A. Shonle and myself.

Typical examples of my new compounds and of methods for preparing them are set forth below.

*Example 1.*—20 g. of 2-aminohexane, cooled to 0° C., is mixed with 21 g. of benzaldehyde, also cooled to 0° C. Heat is evolved, and water separates. After the mixture has stood at room temperature for 5 to 6 hours the water is separated with a separatory funnel and the residue, consisting of crude 2-benzalaminohexane, is dried over anhydrous magnesium sulfate. The dried product is then distilled in vacuo. The distillate is the desired 2-benzalaminohexane, a colorless, viscous liquid boiling at about 150°–153° C. at a pressure of 28 mm. of mercury.

*Example 2.*—By following the process of Example 1, but using 23 g. of 2-aminoheptane and 21.2 g. of benzaldehyde, the final product is 2-benzalaminoheptane. It is a colorless, viscous liquid boiling at about 147°–150° C. at a pressure of 18 mm. of mercury.

*Example 3.*—If the process of Example 1 is carried out using 23 g. of 2-aminoheptane and 13 g. of propionaldehyde, 2-propionalaminoheptane is obtained. It is a pale straw-colored liquid boiling at about 60°–64° C. at a pressure of 7 mm. of mercury.

*Example 4.*—2-n-butanalaminoheptane may be prepared by reacting 40 g. of 2-aminoheptane with 25.5 g. of n-butyraldehyde in the manner set forth in Example 1. It is a substantially colorless liquid boiling at about 71°–74° C. at 8 mm. pressure.

*Example 5.*—By proceeding as in Example 1, but using 20 g. of 2-aminoheptane and 8.5 g. of acetaldehyde, the final product obtained is 2-ethanalaminoheptane, a substantially colorless liquid boiling at about 43°–45° C. at 7–8 mm. pressure.

*Example 6.*—If 2-amino-4-methylhexane is substituted for the 2-aminoheptane of Example 3, 2-propionalamino-4-methylhexane is obtained. It is a pale yellow liquid boiling at about 56°–60° C. at 7 mm. pressure.

*Example 7.*—2-benzalamino-5-methylhexane may be prepared by following the procedure of Example 2 but substituting 2-amino-5-methylhexane for the 2-aminoheptane. It is a colorless, viscous liquid which boils at about 138°–142° C. at 18 mm. pressure.

*Example 8.*—By proceeding as in Example 1, using 26 g. of 2-amino-4-methylheptane and 12.8 g. of isobutyraldehyde, the resulting product is 2-isobutanal-amino-4-methylheptane. It is a colorless liquid boiling at about 76°–80° C. at 8–9 mm. pressure.

*Example 9.*—26 g. of 2-amino-6-methylheptane is reacted with 13 g. of propionaldehyde in the manner described in Example 1. The product obtained is 2-propionalamino-6-methylheptane, a pale yellow liquid boiling at about 65°–69° C. at 7–8 mm. pressure.

*Example 10.*—If the process of Example 1 is followed using 28.6 g. of 2-amino-4,6-dimethylheptane, and 13. g. of propionaldehyde, 2-propionalamino-4,6-dimethylheptane is produced. It is a pale yellow liquid boiling at about 69°–74° C. at 7–8 mm. pressure.

For administration, any of the above aldehyde derivatives may be compounded with an extending medium. Thus, if the derivative is to be administered parenterally, it may be dissolved in a suitable solvent such as propylene glycol or aqueous propylene glycol. Incorporated with other ingredients, my aldehyde derivatives may be adapted for topical application in inhalant compounds or ointments, as in the following examples:

*Example 11.*—An effective inhalant compound may be prepared by incorporating the following ingredients in approximately 100 cc. of liquid petrolatum:

| | | |
|---|---|---|
| 2-propionalaminoheptane | grams | 1 |
| Menthol | do | .75 |
| Camphor | do | .75 |
| Oil of thyme | cc | .3 |
| Liquid petrolatum to make | cc | 100 |

*Example 12.*—An ointment suitable for topical application is componded of the following ingredients.

| | Grams |
|---|---|
| 2-propionalamino-4-methylhexane | 1 |
| Menthol | .7 |
| Camphor | .7 |
| Oil of wintergreen | .7 |
| Anhydrous wool fat | 5 |
| Liquid petrolatum | 25 |
| White petrolatum to make | 100 |

The ingredients and proportions set forth in Examples 11 and 12 above are to be taken as illustrative only.

I claim as my invention:

1. 2-benzalaminoheptane represented by the formula

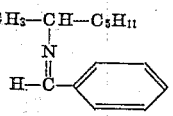

2. An aldehyde derivative of a 2-aminoalkane, said derivative having the general formula

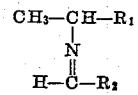

in which $R_1$ represents an alkyl group having from 4 to 7 carbon atoms and $R_2$ represents a hydrocarbon of the group consisting of the phenyl radical and alkyl radicals having from 1 to 3 carbon atoms.

EWALD ROHRMANN.

REFERENCES CITED

The following references are of record in the file of this patent:

UNITED STATES PATENTS

| Number | Name | Date |
|---|---|---|
| 1,749,361 | Stuart | Mar. 4, 1930 |
| 1,780,149 | Powers | Oct. 28, 1930 |
| 2,350,318 | Shonle | May 30, 1944 |
| 2,421,937 | Haury | June 10, 1947 |
| 2,422,013 | Haury | June 10, 1947 |

FOREIGN PATENTS

| Number | Country | Date |
|---|---|---|
| 263,853 | Great Britain | July 8, 1927 |

OTHER REFERENCES

Henze et al., Jour. Am. Chem. Soc., fol. 64 (1942), pages 2878–2880.

Chemical Abstracts, vol. 37, March 1943, pages 1377–1378.